UNITED STATES PATENT OFFICE.

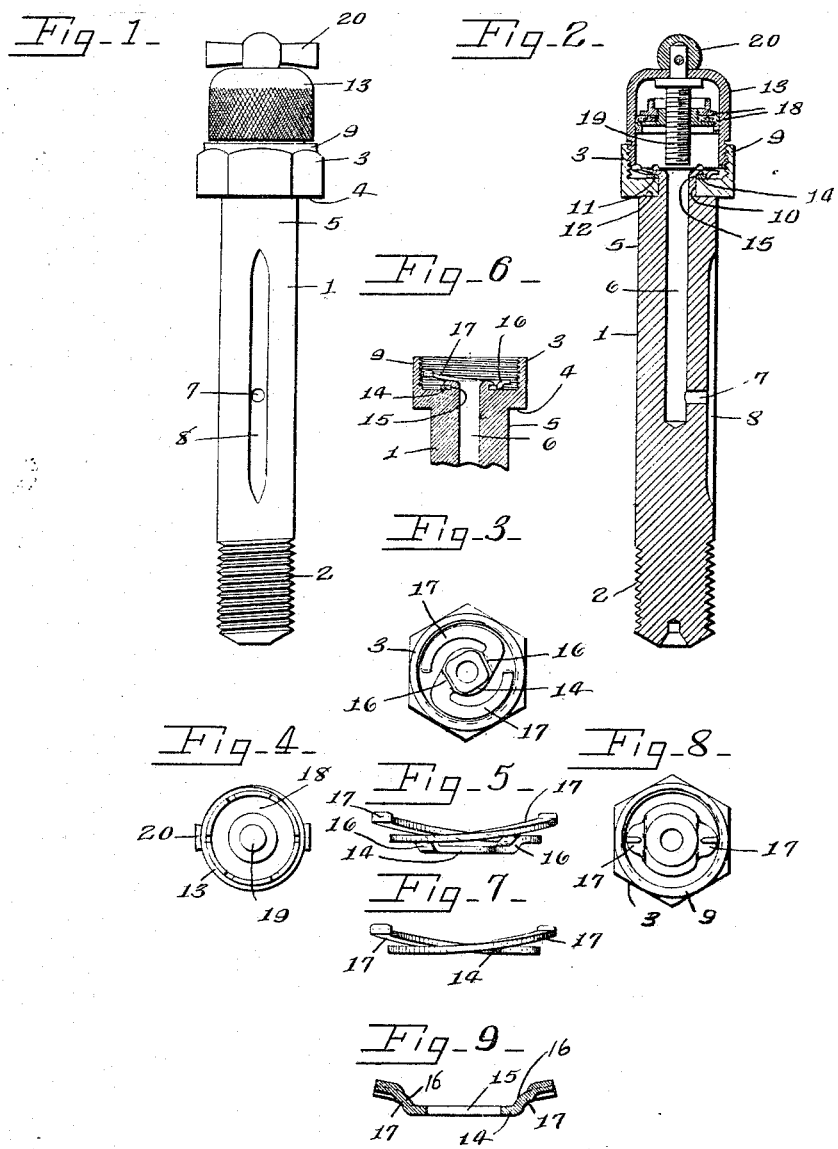

ALEXIS R. PRIBIL, OF DETROIT, MICHIGAN, ASSIGNOR TO GEORGE W. BOWEN, OF AUBURN, NEW YORK.

LUBRICATING DEVICE.

1,259,044. Specification of Letters Patent. Patented Mar. 12, 1918.

Application filed August 25, 1913. Serial No. 786,422.

*To all whom it may concern:*

Be it known that I, ALEXIS R. PRIBIL, a citizen of the United States, and a resident of Detroit, in the county of Wayne and State of Michigan, have invented a new and useful Lubricating Device, of which the following is a specification.

This invention relates to lubricating devices, particularly applicable for supporting and lubricating the eyes of automobile springs, and has for its object an especially simple and efficient structure for the desired purpose, and it consists in the novel combinations and means hereinafter set forth and claimed.

In describing this invention, reference is had to the accompanying drawing, in which like characters designate corresponding parts in all the views.

Figures 1 and 2 are, respectively, an elevation and a longitudinal sectional view of a preferable embodiment of my lubricating device.

Figs. 3 and 4 are end views of the main body and the cap.

Fig. 5 is an elevation of the detached spring catch.

Fig. 6 is a longitudinal section of a modified construction of the main body, the spring catch being also illustrated.

Fig. 7 is an elevation of a modified construction of spring catch.

Fig. 8 is an end view of the main body provided with a modified form of spring catch.

Fig. 9 is an enlarged sectional view of the spring catch shown in Fig. 8.

This lubricating device consists, generally, of a main body or shank and a cap, connected by screw threads, a spring catch for normally locking the body and the cap from turning relatively to each other, and means for ejecting the lubricant.

The main body or shank 1 has one end 2 thereof threaded for receiving a nut, not shown, and its other end is provided with an enlarged head 3 in the form of a cup and having its base formed of angular cross-section and provided with a face 4 projecting beyond the periphery of the intermediate portion of the body or shank 1, said base providing means for facilitating turning of the body or shank 1 and for limiting endwise movement thereof in the eye of the spring through which the same extends.

The intermediate portion of the main body or shank 1 is formed with a peripheral bearing face 5 and with an axial exit or bore 6 having one end opening from the interior of the head 3, and its other end formed with a laterally extending outlet 7 opening into a depression 8 in the bearing face 5. The head 3 is provided with an upwardly extending internally threaded annular flange 9 which rises a limited distance above the contiguous upper face of the main body or shank 1 inclosed by the flange 9.

Said main body 1 is shown in Fig. 2 as consisting of a cup-shaped head and a stem, formed separable and rigidly secured together, the head being provided with an axial opening 10, and the stem having a reduced part passed through the opening 10 and above the contiguous upper face of the closed end of the head, and being provided with annular shoulders 11 and 12 on upper and lower sides of the contiguous portion of the closed end of the head for securing the head and the stem together. However, the main body may consist of a single piece, as shown in Fig. 6.

As best seen in Fig. 2, the cap 13 is formed with a closed top and an open lower end, and its barrel portion is externally threaded at its base for screwing into the flange 9. The lower edge of the cap 13 is provided with suitable notches, and the periphery of the cap is knurled to facilitate turning thereof and for enhancing its appearance.

The spring catch includes a base 14, fixed to the upper face of the main body 1 by the shoulder 11 and formed with a perforation 15 communicating with the exit or bore of said main body. This catch also includes upright portions 16 rising from diametrically opposite sides of the base 14, and spring arms 17 extending radially from the upper ends of the upright portions 16 and terminating in oppositely extending arc-shaped free ends arranged above the plane of the base 14 and the contiguous part of the upper face of the main body 1 and substantially concentric with the flange 9 and with the lower edge of the cap 13, said arc-shaped free ends underlying the lower edge of the cap and having projections at their extremities ratcheting with the notched lower edge of the cap.

If desired, the upright portions 16 of the spring catch may be dispensed with, as shown in Fig. 7, or the spring arms of the catch may be merely radial, as shown in Figs. 8 and 9. Furthermore, the catch may be provided with only one spring arm, if desired.

The means for ejecting the lubricant comprises a plunger 18 movable up and down within the cap and operated by any suitable means, as a revoluble stem 19 having threaded engagement with the plunger and provided with a hand-piece 20 above the closed end of the cap.

To those skilled in the art, it will be readily apparent that the cap 13 may be readily detached to permit the entrance of grease, or other lubricant, within my lubricating device, that after the cap has been unscrewed a limited distance, it may be easily revolved without retardation by the spring catch, and that when the cap is again engaged with the catch, it may be forced downward a greater or less extent to effect the desired holding action thereof by the spring catch.

What I claim, is:—

1. A lubricating device comprising a main body, and a cap connected by screw threads, and a spring catch having a base mounted on the upper face of the main body, an upright portion rising from the base, and a ratcheting spring arm extending laterally from the upper end of the upright portion above the plane of the base and extending in a general direction parallel to the upper face of the main body and the plane of the base and spaced apart from the upper face of the base, the ratcheting arm coacting with the cap, substantially as and for the purpose described.

2. A lubricating device comprising a main body formed with an outlet passage and a cap connected by screw threads, and a spring catch having a base mounted on the upper face of the main body concentric with the outlet passage, a portion extending upwardly above the plane of the base and the contiguous part of said upper face, and a yielding free end underlying and ratcheting with the lower edge of the cap, substantially as and for the purpose set forth.

3. A lubricating device comprising a main body concentric with the outlet passage and a cap connected by screw threads, and a spring catch having a base mounted on the upper face of the main body, and a spring arm having a yielding arc-shaped free end arranged above the plane of the base and the contiguous part of said upper face and underlying and ratcheting with the lower edge of the cap, the arc-shaped free end extending laterally from the major part of the arm, substantially as and for the purpose described.

4. A lubricating device comprising a main body and a cap connected by screw threads, and a spring catch having a base mounted on the upper face of the main body, and a spring arm having a yielding free end substantially concentric with the lower edge of the cap and arranged above the plane of the base and the contiguous part of said upper face and underlying and ratcheting with said lower edge, substantially as and for the purpose specified.

5. A lubricating device comprising a main body and a cap connected by screw threads, and a spring catch having a base mounted on the upper face of the main body, and a spring arm having a substantially radial portion and a free end extending laterally from said substantially radial portion and arranged above the plane of the base and the contiguous part of said upper face, and having its free extremity underlying and ratcheting with the lower edge of the cap, substantially as and for the purpose set forth.

6. A lubricating device comprising a main body and a cap connected by screw threads, and a spring catch having a base mounted on the upper face of the main body, and oppositely extending ratcheting spring arms offset above the plane of the base and the contiguous part of said upper face and coacting with the cap, said arms overlying the face of the base and extending in a general direction parallel to a plane perpendicular to the axis of the main body, substantially as and for the purpose described.

7. A lubricating device comprising a main body and a cap connected by screw threads, and a spring catch having a base mounted on the upper face of the main body, and opposite spring arms having yielding oppositely extending arc-shaped free ends substantially concentric with the lower edge of the cap and arranged above the plane of the base and the contiguous part of said upper face and underlying and ratcheting with said lower edge, said free ends extending laterally from the major part of the spring arms, substantially as and for the purpose specified.

8. A lubricating device comprising a main body and a cap connected by screw threads, the main body having an axial exit, opening from its upper face, and a spring catch having a base mounted on the upper face of the main body and formed with a perforation communicating with the exit, said catch having opposite spring arms having yielding oppositely extending arc-shaped free ends substantially concentric with the lower edge of the cap and arranged above the plane of the base and the contiguous part of said upper face and underlying and ratcheting with said lower edge, substantially as and for the purpose described.

9. A lubricating device comprising a main body and a cap connected by screw threads, the base including a cup-shaped head having an axial opening and a stem having a reduced portion extending through the opening and having annular shoulders on upper and lower sides of the contiguous portion of the closed end of the head for securing the head and the stem together, and a spring catch having a base fixed to the upper face of the closed end of the head beneath the upper shoulder of the stem, and a ratcheting spring arm offset above the plane of the base and the contiguous part of said upper face and coacting with the cap, substantially as and for the purpose described.

In testimony whereof, I have hereunto signed my name in the presence of two attesting witnesses, at Detroit, in the county of Wayne, in the State of Michigan, this 12th day of August, 1913.

ALEXIS R. PRIBIL.

Witnesses:
GEO. F. STANDLEY,
JULE B. STANDLEY.

Copies of this patent may be obtained for five cents each, by addressing the "Commissioner of Patents, Washington, D. C."